United States Patent [19]

Puder

[11] Patent Number: 4,973,611
[45] Date of Patent: Nov. 27, 1990

[54] OPTICAL FIBER BUFFER COATING WITH TG

[75] Inventor: Allen B. Puder, Cupertino, Calif.

[73] Assignee: Uvexs Incorporated, Mountain View, Calif.

[21] Appl. No.: 177,243

[22] Filed: Apr. 4, 1988

[51] Int. Cl.$^5$ .............................................. C08F 2/46
[52] U.S. Cl. ........................................ 522/42; 522/96; 526/301
[58] Field of Search ................... 526/301; 522/42, 96

[56] References Cited

U.S. PATENT DOCUMENTS

| | | | |
|---|---|---|---|
| 4,472,019 | 9/1984 | Bishop et al. | 350/96.3 |
| 4,496,210 | 1/1985 | Ansel et al. | 350/96.3 |
| 4,514,037 | 4/1985 | Bishop et al. | 350/96.23 |
| 4,522,465 | 6/1985 | Bishop et al. | 350/96.30 |
| 4,572,610 | 2/1986 | Krajewski et al. | 350/96.34 |
| 4,607,084 | 8/1986 | Morris | 525/454 |
| 4,624,994 | 11/1986 | Ansel | 525/440 |
| 4,673,705 | 6/1987 | Ansel et al. | 526/301 |
| 4,690,501 | 9/1987 | Zimmermann et al. | 526/301 |
| 4,717,739 | 1/1988 | Chevreux et al. | 526/301 |
| 4,720,529 | 1/1988 | Kimura et al. | 526/301 |

FOREIGN PATENT DOCUMENTS 116672 5/1987 Japan .

*Primary Examiner*—Joseph L. Schofer
*Assistant Examiner*—N. Sarofim
*Attorney, Agent, or Firm*—Roger H. Borrousch

[57] ABSTRACT

Optical fiber buffer coatings with a low glass transition temperature are prepared from acrylated urethane oligomers having a molecular weight of 2,000 and 6,000, an aliphatic monofunctional acrylate or monofunctional aryl-containing acrylate having glass transition temperatures below −20° C., a photoinitiator, and optionally a crosslinking acrylate ester having at least two acrylate or methacrylate groups per molecule and having a molecular weight less than 4,000. These buffer coatings are flexible at low temperatures, such as −60° C., and avoid microbending, resist water absorption, and have low hydrogen generation.

4 Claims, No Drawings

OPTICAL FIBER BUFFER COATING WITH TG

BACKGROUND OF THE INVENTION

1. Field on the Invention

This invention relates to ultraviolet curable composition which is useful as a buffer coating for optical fibers, i.e. a primary coating.

2. Background Information

The transmission of communications by means of optical fibers is commercially important today. This form of transmission is done by sending a beam of light through an optically clear fiber. Because interference with the light beam or its partial loss during the transmission must be at a minimum to make the use of optical fibers a successful communications technology, the optical fibers must be protected from any environment which will cause loss of signal or distortion of the signal. Coating the fibers is one such technique. The optical fibers are coated to protect the fiber surface from damage which can result from abrasion or water, to maintain or increase the fiber strength, and to prevent transmission loss resulting from microbending which can result from mechanical manipulation or changes in temperature. Coating materials which will provide cured films on the optical fiber which has all of these properties is difficult to achieve because improving one property often results in the decrease in another property. Optical fibers are now usually coated with at least two coatings, i.e. a primary coating or buffer coating which is applied immediately after the fiber is formed and a secondary high modulus coating which is put over the buffer coating to further protect the optical fiber. In order for the loss in transmission to be as low as possible, the buffer coat should maintain its flexible properties over a broad temperature range. Especially important is the low temperature flexibility. The low temperature flexibility can be obtained if the coating has a low glass transition temperature, $T_g$.

Buffer coatings, useful in the optical fiber industry that protect the glass fiber from stress and microbending losses, which has the characteristic of low glass transition temperature ($T_g$) has been a goal for sometime. Organic coatings of the prior art have difficulty achieving films which have a $T_g$ sufficiently low to be useful as a buffer coating while maintaining the rapid ultraviolet radiation (UV) cure speeds, low modulus, and physical properties needed in the optical fiber industry. The coatings for optical fibers, first used, were silicone oils, cellulosic lacquers, blocked urethanes, and room temperature vulcanizable silicones. Problems exhibited by these coating materials were handling, stability, durability, and application speed. Such problems can be overcome by UV curing. Except for the room temperature vulcanizable silicones, none of these coating materials provided low temperature flexibility down to temperatures of $-40°$ C. to $-60°$ C.

Ultraviolet radiation curable compositions are known in the art including those which are based on diacrylate-terminated polyurethane oligomers. Compositions made from these oligomers produce relatively hard films when cured. When the diacrylated-terminated polyurethane oligomers are diluted with a radiation-curable monomer having a low $T_g$, a large amount of the monomer is necessary to achieve a soft cured material, however, the soft cured material has little strength and little utility as described by Ansel in U.S. Pat. No. 4,624,994, issued Nov. 25, 1986 on application Ser. No. 170,148, filed July 18, 1980. Ansel teaches that to make a radiation curable liquid coating which is both soft and tough, one must make an oligomer which is made up of polyurethane, polyamide, or polyurea having a molecular weight of 2000 to 8000, one amide, urea, or urethane group for every 300 to 900 units of weight, and polyalkylene polyether, polyalkylene polysulfide, or polyalkylene polyester groups. Ansel teaches how such oligomers are made. Compositions based on these oligomers constitute 20 to 50 weight percent of a radiation-curable monoethylenically unsaturated monomer having a $T_g$ below about 10° C. to provide the softness, and 2 to 20 weight percent of a monoethylenically unsaturated monomer which has a strong capacity for hydrogen bonding to provide the desired toughness.

Although Ansel in U.S. Pat. No. 4,624,994 (Ser. No. 170,148) teaches UV curable compositions with $T_g$ below 10° C. the properties begin to fall off when exceptionally low temperatures are encountered and it is clearly desirable to extend the range of low temperature flexibility to lower temperatures without exhibiting unacceptable stiffness. Ansel et al teach this in U.S. Pat. No. 4,496,210, issued Jan. 29, 1985. based on application Ser. No. 398,161, filed July 19, 1982, Ansel et al teach that coating materials with low modulus at low temperature such as $-60°$ C. can be obtained by compositions containing a liquid, polyethylenically unsaturated, radiation-curable resin which is an organic polysiloxane having 2 to 6 reactive side chains each of which carry a functional group including acrylic and methacrylic groups. Such silicone carbinol-based polyurethane diacrylates are polysiloxanes which have at least one monoethylenically unsaturated group for every 500 to 5,000 units of molecular weight.

Bishop et al in U.S. Pat. No. 4,472,019, issued Sept. 18, 1984, describe a buffer coating made as described by Ansel. The buffer coating is made by reacting 4 moles of 4,4'-methylene bis(cyclohexyl isocyanate) with 2 moles of polyoxypropylene glycol of molecular weight 1000 and then reacting with 2 moles of 2-hydroxyethyl acrylate and then with one mole of polyoxypropylene diamine of molecular weight of 230 in the presence of 3,4 moles of N-vinyl pyrrolidone and 917 moles of phenoxyethyl acrylate. This mixture so made is mixed with 3% by weight of diethoxy acetophenone to make it UV curable.

Bishop et al teach in U.S. Pat. No. 4,514,037, issued April 30, 1985, buffer coatings characterized by a relatively low tensile modulus at room temperature, below 10,000 psi (69 MPa), preferably below 2,000 psi (13.8 MPa). Bishop states that very low modulus ultraviolet-cured coatings are described in R. Ansel, Ser. No. 170,148, filed July 18, 1980, Bishop et al describes these coatings as follows: Ethylenic-terminated polyurethane, polyamide or polyurea oligomers having a molecular weight in the range of about 2000 to about 8000 and containing one amide, urea or urethane group for every 300 to 900 units of molecular weight, and containing polyalkylene polyether. polyalkylene polythiol or polyalkylene polyester in which the alkylene moiety contains 2 to 6 carbon atoms. These diacrylate oligomers are combined with 20% to 50% of the composition of a radiation-curable monoethylenic monomer having a $T_g$ below about $-10°$ C. such as phenoxyethyl acrylate, and with 2% to 20% of a monoethylenic monomer having a strong capacity for hydrogen bonding, such as N-vinyl pyrrolidone. Bishop et al also describe this buffer coating in U.S. Pat. No. 4,522,465, issued June 11, 1985.

Krajewski in U.S. Pat. No. 4,572,610, issued Feb. 25, 1986, filed May 21, 1984, teaches that radiation-curable coatings, and especially UV-cured coatings, are particularly desirable for the coating of optical fibers because they can be rapidly applied and rapidly cured on the freshly drawn fiber as part of the fiber's production and before the fiber can be abraded by contact with other fibers. Krajewski teaches that these coatings present a considerable problem in the area of low temperature properties. The first radiation-curable coatings were too hard as shown by the fact that once the service temperature was reduced to below room temperature, stress induced microbending was encountered. Such microbends impair the ability of the fibers to act as a wave guide at even moderately low service temperatures. Krajewski teaches that Ansel (Ser. No. 170,148) taught an acrylate polyurethane-type coating system which cured reasonably rapid with UV, had good adhesion to glass fiber, and had a low tensile modulus such that reasonable microbending resistance at moderately low temperature was achieved. Krajewski also teaches that the Ansel compositions have too high a tensile modulus to adequately avoid microbending problems under severe service conditions, down to about −60° C. However, Ansel et al (Ser. No. 398,161) made progress in this direction by providing compositions which would be soft enough to resist microbending at these very low service temperatures while still maintaining minimal physical integrity at room temperature. These compositions by Ansel et al are the silicone carbinol-based polyurethane diacrylates described above. These diacrylates do not have a refractive index above 1.48 so that their utility is limited. To achieve the combination of low temperature flexibility and high refractive index acrylate-containing polybutadienes have been tried. However, the desirable characteristics do not remain constant with temperature and upon heat aging they progressively harden and the refractive index becomes lower. With this background, Krajewski describes his invention which is a radiation-curable diethylenically unsaturated polyurethane resin which has a Tg below about 20° C., preferably below about 0° C. is a solid, non-flowable cross-linked film at room temperature with a low tensile modulus at low temperature, i.e. less than about 10000 psi (69 MPa) at −40° C., preferably less than about 5000 psi (34.5 MPa) at −60° C. and a refractive index above 1.48. This urethane resin of Krajewski's is made by reacting a dihydroxy-terminated liquid polybutadiene, in which the unsaturation has been reacted with halogen, with organic isocyanate and a monoethylenically unsaturated monomer carrying a single hydroxy group to form a diethylenic polyurethane having a halogen-containing essentially saturated polybutadiene backbone.

These patents describe many ways of improving the buffer or primary coating for optical fiber. However, there still remains the need for an optical fiber buffer coating material which has an improved overall property profile. The problem illustrated by art shows that when one improves one property, it most often results in a negative improvement of another property.

SUMMARY OF THE INVENTION

The present invention solves the above problem by providing compositions which can be used as buffer or primary coatings for optical fibers and which cure to films exhibiting significant enhanced performance by providing a low $T_g$, fast UV curing, and low modulus combined with physical properties desired in the optical fiber industry.

This invention relates to an ultraviolet curable composition consisting essentially of a blend of (A) 30 to 55 weight percent of an acrylated urethane oligomer containing an average of about 2 acryl groups selected from the group consisting of acrylate and methacrylate, said acrylated urethane oligomer having a number average molecular weight of from 2,000 to 6,000, (B) 35 to 65 weight percent of a monofunctional acrylate having a $T_g$ less than −20° C. selected from the group consisting of an aliphatic monofunctional acrylate ester having a molecular weight less than 1,000 and a monofunctional aryl-containing acrylate of the general formula (I)

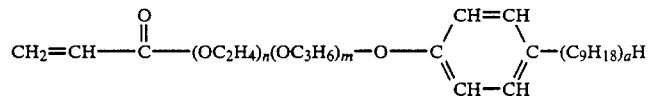

in which at least one of n or m is at least 1 and the total average value of n and m is sufficient to provide a viscosity at 25° C. of 0.01 to 0.2 Pa.s, and a is 0 or 1, (C) 0 to 10 weight percent of a crosslinking acrylate ester having at least two acrylate or methacrylate groups per molecule and having a molecular weight less than 4,000, (D) 0.2 to 10 weight percent of photoinitiator, and (E) an effective amount of polymerization inhibitor to permit storing the composition in one package.

DESCRIPTION OF THE PREFERRED EMBODIMENTS

The compositions of the present invention are curable by exposure to ultraviolet radiation. These compositions use acrylates (such as organic acrylate monomers) and acrylated urethane oligomers which have a combination of aliphatic and aromatic structures. These compositions consist essentially of acrylated urethane oligomer, monofunctional acrylate, photoinitiator, polymerization inhibitor, and optionally an acrylate ester crosslinker.

Compositions of the present invention are a unique combination of monofunctional acrylates and acrylated urethane oligomers which have the desired low glass transission temperatures, $T_g$, that are necessary and useful in buffer coatings for the optical fiber industry.

The compositions of the present invention contain from 30 to 55 parts by weight of an acrylated urethane oligomer, ingredient (A), in which there is an average of about 2 acrylate or methacrylate groups. These urethane oligomers have a number average molecular weight of from 2,000 to 6,000. The isocyanates include aliphatic and aromatic diisocyanates in which the aliphatic diisocyanates can be illustrated by 1,6-hexamethylene diisocyanate, 1,4-hexamethylene diisocyanate. 2,2,4-trimethylhexamethylene diisocyanate, 2,4,4-trimethylhexamethylene diisocyanate, 4,4'-methylene-bis(cyclohexyl)isocyanate. isophorone diisocyanate, and 1-methyl-2,4-diisocyanatecyclohexane; and the aromatic diisocyanates can be illustrated by toluene diisocyanate. The acrylated urethane oligomers are known in the art and those which are particularly useful in the present invention are those which are described in U.S. Pat. No. 4,607,084, issued August 19, 1986, to Morris, which is hereby incorporated by reference to show the acrylated urethane oligomers and their preparation.

The acrylated urethane oligomers can be mixtures of two or more different oligomers or prepolymers. For example, a mixture of an acrylated urethane prepolymer and a polyester urethane acrylate, which is a preferred ingredient for (A). The acrylated urethane prepolymer provides strength to the cured films and the polyester urethane acrylate provides elongation to the cured films. They can also be blends, such as those prepared from polyether diols. The acrylated urethane oligomers can also contain monofunctional reactive solvents. Such reactive solvents include alkyl acrylates, alkyl methacrylates, alkoxyalkyl acrylates, alkoxyalkyl methacrylates, allyl acrylate, and phenoxyethyl acrylate. The reactive solvent can be present in amounts of from 0 to 20 weight percent based on the total weight of commercially available acrylated urethane oligomer. Preferably, if the reactive solvent is present it is present in an amount of from about 10 to about 20 weight percent. For the purposes of this invention, the term "oligomer" and "prepolymer" are interchangeable. An example of a commercially available acrylated urethane oligomer is Uvithane 782 sold by Morton Thiokol Corporation. Morton Chemical Division, Ill. Uvithane 782 is a diacrylate polyester urethane acrylate oligomer which has a viscosity at 49° C. of 80 to 120 Pa.s, a viscosity at 71° C. of 20 to 35 Pa.s, and a viscosity at 82° C. of 8.5 to 16.5 Pa.s; has an average molecular weight of 5,500; and has 0.04 to 0.05 unsaturation equivalent per 100 grams. Uvithane 783 is not useful in the present compositions because it provides cured products which are too hard. Uvithane 783 also is a diacrylate like Uvithane 782 but has a molecular weight of 1,200; a viscosity at 49° C. of 60 to 200 Pa.s and at 82° C. 5 to 11 Pa.s; and 0.17 to 0.205 unsaturation equivalent per 100 grams. Uvithane 782 is the preferred acrylated urethane oligomer.

Ingredient (B) of the compositions of this invention is a unique monofunctional acrylate having a low glass transition temperature, $T_g$, i.e. below $-20°$ C. and is compatible with ingredient (A) and with ingredient (C) when present. Ingredient (B) gives to the cured films made from these compositions improved flexibility at low temperatures and allows the cured films to pass thermal cycling shock tests, and low modulus at service temperatures. Ingredient (B) is a monofunctional acrylate selected from an aliphatic monofunctional acrylate ester having a molecular weight less than 1,000 and a monofunctional aryl-containing acrylate of the general formula (Formula I)

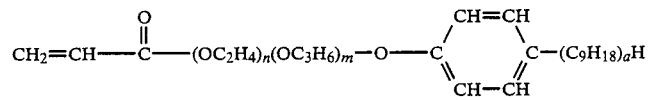

in which at least one of n or m is at least 1 and the total average value of n and m is sufficient to provide a viscosity at 25° C. of 0.01 to 0.2 Pa.s, and a is 0 or 1. An example of an aliphatic monofunctional acrylate ester is C-9013 which is sold by Sartomer Company of Pennsylvania, has a boiling point of 121° C. at 10 mmHg, has a viscosity at 25° C. of 0.005 to 0.015 Pa.s and contains 160 ppm±20 ppm of 4-methoxyphenol.

Examples of the acrylates having Formula I are shown by the following formulae and are sold by Toagosei Chemical Industry Co., Ltd. of Tokyo, Japan: Aronix(R) M-101, having a viscosity at 25° C. of 0.02 Pa.s. a $T_g$ of $-25°$ C. and a formula of

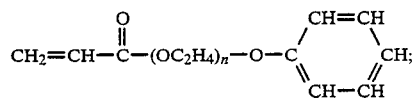

Aronix(R) M-113, having a viscosity at 25° C. of 0.11 Pa.s, a $T_g$ of $-43°$ C., and a formula of

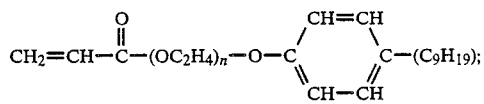

and Aronix(R) M-117, having a viscosity at 25° C. of 0.13 Pa.s and a $T_g$ of $-20°$ C., and a formula of

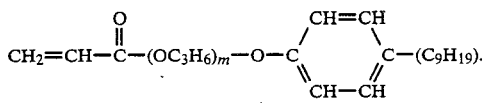

The preferred acrylates of ingredient (B) are those of Formula I and the most preferred is M-113, which is also known as alpha(1-oxo-2-propenyl)-omega-(nonylphenoxy)-poly(oxy-1,2-ethanediyl). Ingredient (B) is present in an amount of from 35 to 65 weight percent of the composition.

The compositions of the present invention can also contain a crosslinking acrylate ester, ingredient (C), having at least two acrylate or methacrylate groups per molecule and a molecular weight less than 4,000 and act as a crosslinker for the composition and speed up the rate of UV cure. These crosslinking acrylate esters of (C) can be present in amounts of from 0 to 10 weight percent of the composition. Preferably ingredient (C) is present in an amount of at least 0.1 weight percent of the composition with the most preferred amounts being from 3 to 7 weight percent of the composition.

Examples of crosslinking acrylate esters having two acrylate groups per molecule are 1,6-hexanediol diacrylate; a polybutadiene diacrylate having a molecular weight less than 4,000 is illustrated by C-5000 sold by Sartomer Company of Pennsylvania, has a number average molecular weight of 3,000, a viscosity at 25° C. of 4.5 to 5 Pa.s, and contains 400 ppm BHT, a butylated hydroxy toluene; and a polyoxyalkylated diacylate having a molecular weight less than 1,000 is illustrated by C-9000 which has a number average molecular weight of 800, a viscosity at 25° C. of 0.12 Pa.s, and 250 ppm of 4-methoxyphenol.

Examples of crosslinking acrylate ester with more than two acrylate groups per molecule are trimethylolpropane trimethylacrylate (mol. wt.=338), pentaerythritol tetraacrylate (mol. wt.=352), ethoxyated trimethylolpropane triacrylate (mol. wt.=428), pentaerythritol acrylate (contain three acrylate groups, mol. wt.=298), di-trimethylolpropane tetraacrylate (mol. wt.=438), tirmethylolpropane triacrylate (mol. wt.=296), and di-pentaerythritol monohydroxy pentaacrylate (mol. wt.=524). These acrylate esters are available commercially and are usually sold with an inhibitor present. Some of these commercially available acrylate esters may also contain small amounts of solvent which is a result of their preparation. The preferred acrylate esters for ingredient (C) are those having at least three acrylate or methacrylate groups per molecule of which di-pentaerythritol monohydroxy pentaacrylate is the preferred species.

The compositions of the present invention contain a photoinitiator, ingredient (D), to provide the ultraviolet radiation curable property. The photoinitiator can be any of those which are known in the art for curing acrylates and methacrylates. Such photoinitiators include 2,2-diethoxyacetophenone, benzoin methyl ether, benzoin ethyl ether, benzoin isopropyl ether, alpha-methylbenzoin, alphaethylbenzoin, alpha-methyl benzoin methyl ether, alphaphenylbenzoin, alpha-allylbenzoin, anthraquinone, methylanthraquinone, ethylanthraquinone, tertiary butylanthraquinone, benzil, diacetyl, benzaldehyde, acetophenone, benzophenone, omega-benzoin, 2,3-pentanedione, hydroxycyclohexylphenyl ketone, hydroxymethyl phenylpropanone, and xanthone. The photoinitiator is used in amounts of from 0.2 to 10 weight percent of the composition and which are suitable to provide cure of the composition when it is exposed to ultraviolet radiation. The preferred photoinitiator is 2-hydroxy-2-methyl-1-phenyl-propan-1-one and the preferred amount is from 4 to 8 weight percent of the composition.

The compositions of this invention require an effective amount of polymerization inhibitor to permit packaging the total composition in one package for storing and shipping. The present composition usually does not require polymerization inhibitor in amounts greater than present with ingredients (A), (B), and (C) when purchased from a manufacturer. If these amounts are insufficient, one can add additional polymerization inhibitor. The most common polymerization inhibitors are 4-methoxy-phenol, hydroquinone, and phenothiazine. Amounts of the inhibitor would be expected to range from about 1 ppm to about 500 ppm and can be a single inhibitor or a combination of two or more inhibitors.

The compositions of this invention have a long pot life, a long shelf life, low temperature flexibility which is sufficient to provide stress relieving properties when coated on optical fiber, the observance of microbending is low, low modulus at room temperature and below room temperature, pass thermal shock test, cure fast, are easy to use in production, are essentially solvent free, are a one package (one part or one component) system and these properties are achieved without substantially changing the other physical characteristics needed for an optical fiber buffer coating.

The compositions of this invention can be prepared by mixing the ingredients. The method of mixing is not particularly critical except that the ingredients should be mixed to homogeneity. Because some of the ingredients may be more viscous than others, the mixing procedure maybe more difficult and slight heating may help readily disperse the ingredients. It may also be an advantage if the polymerization inhibitors are present during the early stages of the mixing procedure. After the composition is prepared, it is stored in containers which protect it from ultraviolet radiation until cure is desired.

The compositions of this invention can be cured by exposure to ultraviolet radiation. The compositions have the ability to withstand thermal shock from −65 degrees C. to 150 degrees C. The compositions of this invention exhibit a low weight loss upon cure and a low weight loss upon heating the cured product. The compositions also exhibit humidity resistance, resistance to water absorption, and low hydrogen generation upon heating.

The compositions of the present invention are useful as a buffer coating for optical fibers. These compositions can be applied at the time of drawing optical fibers. They are immediately coated on the fiber so that the surface of the fiber does not come into contact with damaging substances such as moisture from the air, mechanical abrasion of the fibers touching other bodies including each other. Because it is difficult to keep the fiber isolated under conditions which avoid all such damaging environmental materials, they are coated immediately upon formation. Such techniques are known in the art. The compositions of the present invention are required to be physically tough enough to withstand the coating process and the additional coating processes where a secondary coating is applied to provide additional protection against mechanical and chemical damaging conditions. Besides protecting the fiber, the buffer coating must also meet other requirements among which are avoid microbending, be flexible at low temperature which is exhibited by a low $T_g$ and a low modulus at these low temperatures, such as below 0° C., protect the fiber surface from water absorption, has low generation of hydrogen which also causes transmission losses, and cures rapidly when exposed to UV radiation.

The following examples are presented for illustrative purposes and should not be construed as limiting the invention which is properly delineated in the claims. In the following examples, "part" or "parts" represents "part by weight" or "parts by weight", "%" are percent by weight unless otherwise stated.

EXAMPLE 1

A diacrylate-terminated polyester urethane acrylate, Uvithane 782 sold by Morton Thiokol, Inc., Morton Chemical Division, Chicago, Ill., was heated in an oven to a temperature of 120° F. The heated Uvithane 782 was added to a mixing vessel containing alpha(1-oxo-2-propenyl)-omega-(nonylphenoxy)-poly(oxy-1,2-ethanediyl) (M-113). When the resulting mixture was homogeneous, the agitation was stopped and the mixture was allowed to cool to room temperature. Then 2-hydroxy-2-methyl-1-phenyl-propan-1-one (Darocur 1173) and dipentaerythritol monohydroxy pentaacrylate were added. The mixing blade was then started and mixing was continued until the resulting mixture was homogeneous. The resulting composition was an optical fiber buffer coating composition which cured both by exposure to ultraviolet radiation. The ingredients and their amounts were:

| Parts by weight | Ingredient |
|---|---|
| 50 | Uvithane 782 |
| 60 | M-113 sold by Toagosei Chemical Industry Co., Ltd, of Tokyo, Japan |
| 5 | Dipentaerythritol monohydroxy pentaacrylate, SR-399, sold by Sartomer Company, Division of Sartomer Industries, Inc., Pennsylvania |
| 6 | Darocur(R) 1173, sold by EM Chemicals, EM Industries Company, Hawthorne, New York |

This mixture had a viscosity of 8.8 Pa.s at 25° C. When this mixture was exposed to ultraviolet radiation for 2 to 4 seconds, it cured to a film which had a tensile strength at break of 425 psi, a Young's modulus of 749 psi, a 2.5% elongation modulus of 566 psi. an elongation at break of 68%, a Shore A hardness of 45, a weight loss at 70° C. for 7 days of 8.8 weight percent, a hydrogen generation of 0.039 microgram per gram of composition after 16 hours at 150° C., and a shelf life greater than 6 months.

A film cured by exposure to UV radiation was tested for tensile strength, elongation, and Young's modulus initially, after immersion in water at ambient temperature for five days and after drying in air for five days. The results were, initial tensile strength at break of 2.62 MPa, after 5 days immersion in water=2.93 MPa. and after drying for 5 days=4.75 MPa; the initial elongation at break=79%, after 5 days immersion in water=80%, and after drying for 5 days=56%; and initial Young's modulus=4.0 MPa. after 5 days immersion in water=5.4 MPa. The amount of weight gained in 5 days immersion was one weight percent.

That which is claimed is:

1. An ultraviolet curable composition consisting essentially of a blend of
   (A) 30 to 55 weight percent of an acrylated urethane oligomer containing an average of about 2 acryl groups selected from the group consisting of acrylate and methacrylate, said acrylated urethane oligomer having a number average molecular weight of from 2,000 to 6,000,
   (B) 35 to 65 weight percent of a monofunctional aryl-containing acrylate of the general formula (I) having a $T_g$ less than $-20°$ C.

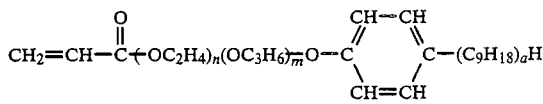

in which at least one of n or m is at least 1 and the total average value of n and m is sufficient to provide a viscosity at 25° C. of 0.01 to 0.2 Pa.s, and a is 0 or 1,
   (C) 0 to 10 weight percent of a crosslinking acrylate ester having at least two acrylate or methacrylate groups per molecule and having a molecular weight less than 4,000,
   (D) 0.2 to 10 weight percent of photoinitiator, and
   (E) an effective amount of polymerization inhibitor to permit storing the composition in one package.

2. The composition according to claim 1 in which the crosslinking acrylate ester of (C) is present in an amount of at least 0.1 weight percent.

3. The composition according to claim 2 in which the crosslinking acrylate ester of (C) is selected from the group consisting of 1,6-hexanediol diacrylate, trimethylol propane triacrylate, di-trimethylol propane tetraacrylate, pentaerythritol triacrylate, dipentaerythritol monohydroxy pentaacrylate, pentaerythritol tetraacrylate, trimethylolpropane trimethacrylate, and ethoxyated trimethylolpropane triacrylate.

4. The composition according to claim 3 in which the acrylated urethane oligomer of (A) has a viscosity at 49° C. of from 0.8 to 2 Pa.s and a viscosity at 82° C. of from 0.08 to 0.17 Pa.s, the monofunctional aryl-containing acrylate of (B) is alpha(1-oxo-2-propenyl)-omega-(nonylphenoxy)-poly(oxy-1,2-ethanediyl) having a viscosity at 25° C. of from 0.1 to 0.12 Pa.s, the crosslinking acrylate ester of (C) is present in an amount of from 3 to 7 weight percent and is dipentaerythritol monohydroxy pentaacrylate, and the photoinitiator of (D) is 2-hydroxy-2-methyl-1-phenyl-propan-1-one and is present in an amount of from 4 to 8 weight percent.

* * * * *